United States Patent
Shelp et al.

(10) Patent No.: US 6,309,533 B1
(45) Date of Patent: Oct. 30, 2001

(54) REMOVAL OF OXYGEN FROM WATER

(75) Inventors: Gene Sidney Shelp, Guelph; Ward Chesworth, Eden Mills, both of (CA)

(73) Assignee: ENPAR Technologies Inc., Guelph (CA)

( * ) Notice: Subject to any disclaimer, the term of this patent is extended or adjusted under 35 U.S.C. 154(b) by 0 days.

(21) Appl. No.: 09/402,290

(22) PCT Filed: Mar. 24, 1998

(86) PCT No.: PCT/CA98/00255

§ 371 Date: Sep. 22, 1999

§ 102(e) Date: Sep. 22, 1999

(87) PCT Pub. No.: WO98/42457

PCT Pub. Date: Oct. 1, 1998

(30) Foreign Application Priority Data

Mar. 24, 1997 (GB) .................................................. 9706043

(51) Int. Cl.⁷ ........................................................ C02F 1/461

(52) U.S. Cl. .......................... 205/742; 205/745; 588/204
(58) Field of Search ..................................... 205/742, 745; 588/204

(56) References Cited

U.S. PATENT DOCUMENTS 5,575,927 * 11/1996 Sivavec et al. ...................... 210/757
5,630,934 * 5/1997 Chesworth et al. .................. 205/745

* cited by examiner

Primary Examiner—Arun S. Phasge
(74) Attorney, Agent, or Firm—Anthony Asquith & Co.

(57) ABSTRACT

For alleviating acid mine drainage arising from oxygenated water passing through pyrite, the water is de-oxygenated in an intercepting protective layer, which comprises a mixture of grains of pyrite and grains of iron. The grain sizes, concentrations, etc are selected to create an ensemble of galvanic cells at the points of contact between the iron grains and the pyrite grains. The pyrite cathode material becomes cathode-protected, and the water becomes de-oxygenated, by the electrolytic action.

16 Claims, 4 Drawing Sheets

REMOVAL OF OXYGEN FROM WATER

This application is a 371 of PCT/CA98/00255 filed Mar. 24, 1998.

BACKGROUND TO THE INVENTION

This invention is concerned with de-oxygenation of water, and the applicability of same to the treatment of acid mine drainage (AMD). AMD is caused when water passes through a body of sulphide mineral, in the presence of oxygen. AMD is usually associated with dumped waste sulphide tailings from mining operations, which have become exposed to the atmosphere. Often, the sulphide is pyrite (iron sulphide, FeS2), but the problem arises with other sulphides.

The sulphide is safe, i.e water infiltrating through the sulphide tailings does not pick up acidity, if oxygen is excluded. If oxygen is present, the pH of the water passing through the sulphide (and into the groundwater) can become as low as 2.

Often, sulphide tailings are kept safe by being kept under water; at least, that is the aim of the mine operators. However, keeping tailings safe by keeping them submerged is risky in that the water table might fall, or a tailings dam might fail, etc, not to mention the effects of earthquakes, landslides, etc whereby the sulphide can become exposed to atmospheric oxygen.

The invention is aimed at providing a low-cost, low-maintenance, system for rendering sulphide bodies safe, in the above sense. The invention is aimed at removing oxygen from water that will pass through the body of sulphide. The invention may also be applied in other fields where de-oxygenation is required.

THE PRIOR ART

The task of resubmerging a body of sulphide tailings that has become exposed can be prohibitively expensive, especially since the requirement might arise decades (or centuries) after the mine operators have departed.

Often, when sulphide has become exposed, the technique followed has been to ignore the sulphide itself, and rather to treat the resulting acidified water downstream. That is to say, the water is allowed to percolate through the exposed sulphide, and is allowed to enter the groundwater, but then the water is treated (i.e its acidity neutralised) as it enters streams and lakes, etc, or as it approaches a well or other sensitive area.

Attempts have been made to cover exposed bodies of tailings over with a waterproof cover, in the form of a sheet of plastic or other man-made waterproof material, and thus to channel precipitation water away from the sulphide. However, waterproof covers tend to start to leak after a few years. Covering the sulphide with a layer of soil and vegetation has also been done, but again with less than reliable results. Such systems, even at the low levels of reliability typically achieved, and despite their huge expense, have the disadvantage that the need for maintenance increases as the decades go by. The sulphide remains, more or less for ever, as a potential source of acidity, should the covering ever fail.

Patent publication U.S. Pat. No. 5,630,934 (Chesworth et al, May 1997) shows a system for making a galvanic electrolytic cell, by making a body of sulphide tailings into a cathode, creating an anode from a body of e.g scrap metal, and ensuring electrolytic continuity in the water between the two.

Patent publication WO-95/29129 (Giliham et al, November 1995) shows an electrolytic system for treating water, which involves the use of granular iron.

Patent publication U.S. Pat. No. 4,990,031 (Blowes et al, February 1991) shows a micro-biological system for de-oxygenating water, for protecting a sulphide body.

Patent publication WO-91/08176 (Gillham, November 1993) shows a system for lowering the redox potential of water, (i.e for de-oxygenating the water) by passing the water through granular iron.

Patent publication U.S. Pat. No. 4,561,948 (Stiller, December 1985) shows an electrolytic cell, which uses pyrite and iron as the electrodes, for the treatment of acidified water.

GENERAL FEATURES OF THE INVENTION

The invention lies in providing a layer comprising a mixture of grains (particles) of a sulphide mineral with grains of a material that lies on the more electro-positive side of the sulphide, in the electro-chemical series. Water infiltrating through this layer becomes de-oxygenated, as described and explained herein. The water then may be passed to substances which might lead to the release of toxic substances if exposed to oxygen.

The invention involves the process of cathode-protection. In this process electrons pass from the anode of a galvanic cell, via an electrical connection, to the cathode. The anode dissolves into the aqueous electrolytic solution of the cell, and is said to be sacrificial. The cathode is stabilised by the electrons flowing towards it, does not dissolve, and is said to be protected. In any cell having electrodes of materials that are separated in the electro-chemical series, the electro-positive anode material tends to go into solution (i.e to be sacrificed), thereby stabilising and protecting the electro-negative cathode material.

In the invention, the points of contact between the grains of the different materials serve as the conductors joining the electrodes of the cell.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

The redox state of a chemical thermodynamic system can be measured by the Eh voltage of the system. This measurement may be compared with the use of pH as a measurement of the acidity of the system. The two parameters, Eh and pH, can be plotted as the co-ordinates of a graph, for a given concentration-combination of elements. The various elements, at the particular concentrations in question, combine with each other, and with water, to form different substances and species, depending on the Eh-pH conditions, and lines can be drawn on the graph that indicate the Eh-pH conditions under which this or that substance is favoured as the predominant form. Such a graph is referred to as an Eh-pH diagram, or a Pourbaix diagram. The thermodynamic calculations from which the data on the predominant forms of the different substances and states is derived are explained in the textbook *Atlas of Electrochemical Equilibna in Aqueous Solutions* (Michael Pourbaix, 1974).

Figure 1:
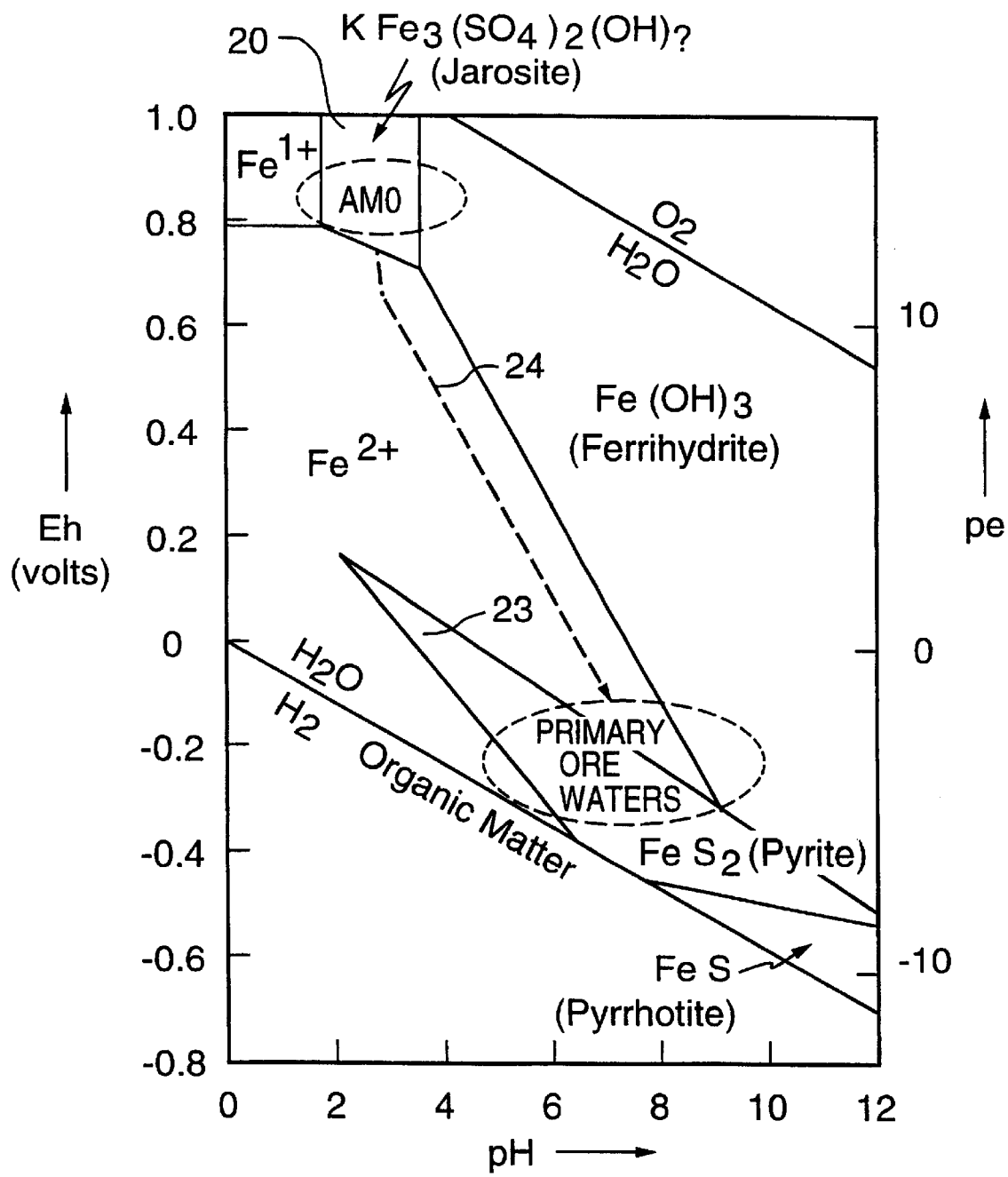
FIG. 1 is a Pourbaix diagram of an aqueous solution of the kind typically encountered when acid mine drainage is a problem.

FIG. 1 is an Eh-pH diagram of an Fe,O,H,S,K system, of the kind that can lead to acid mine drainage (AMD). The diagram is drawn for the following concentrations in the aqueous phase: Fe=10e−6 moles per liter, K=10e−4 mo/l, and S=10e−3 mo/l. The substance Jarosite is possible in the Eh-pH region 20, as shown on the diagram, under conditions which can easily arise if the mine tailings are exposed to the atmosphere. Water passing through such a substance as Jarosite can emerge with a dangerous level of acidity.

If oxygen is eliminated, however, pyrite, FeS2, predominates at an Eh of about −0.1 volts or lower (region 23) and water passing through the pyrite can emerge at more or less neutral acidity.

Figure 2:
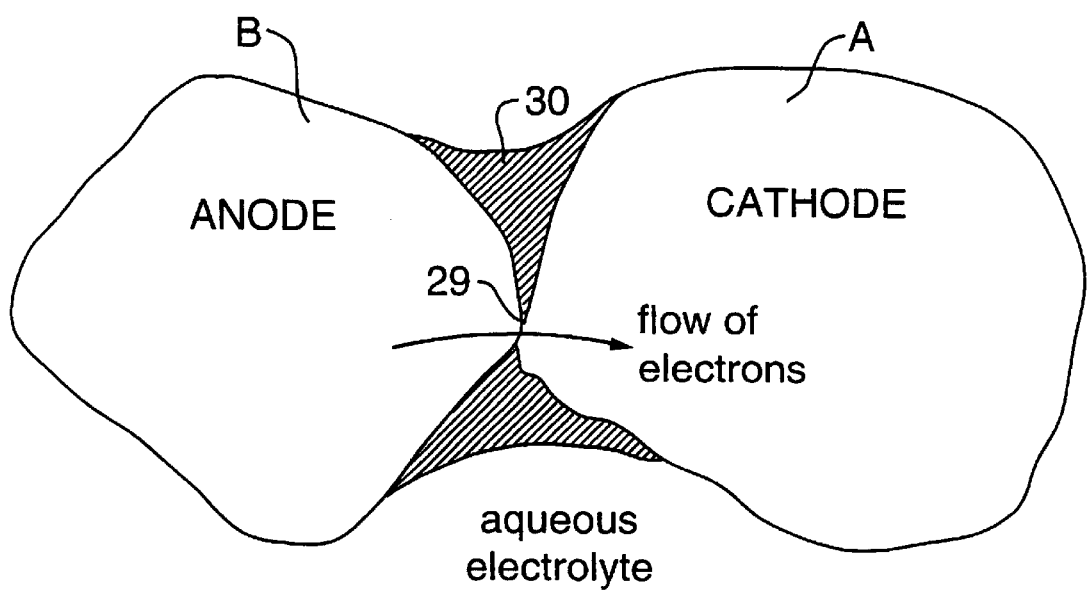
FIG. 2 is a diagram of a grain of sulphide and a grain of iron, arranged to form a galvanic cell.
Figure 3:
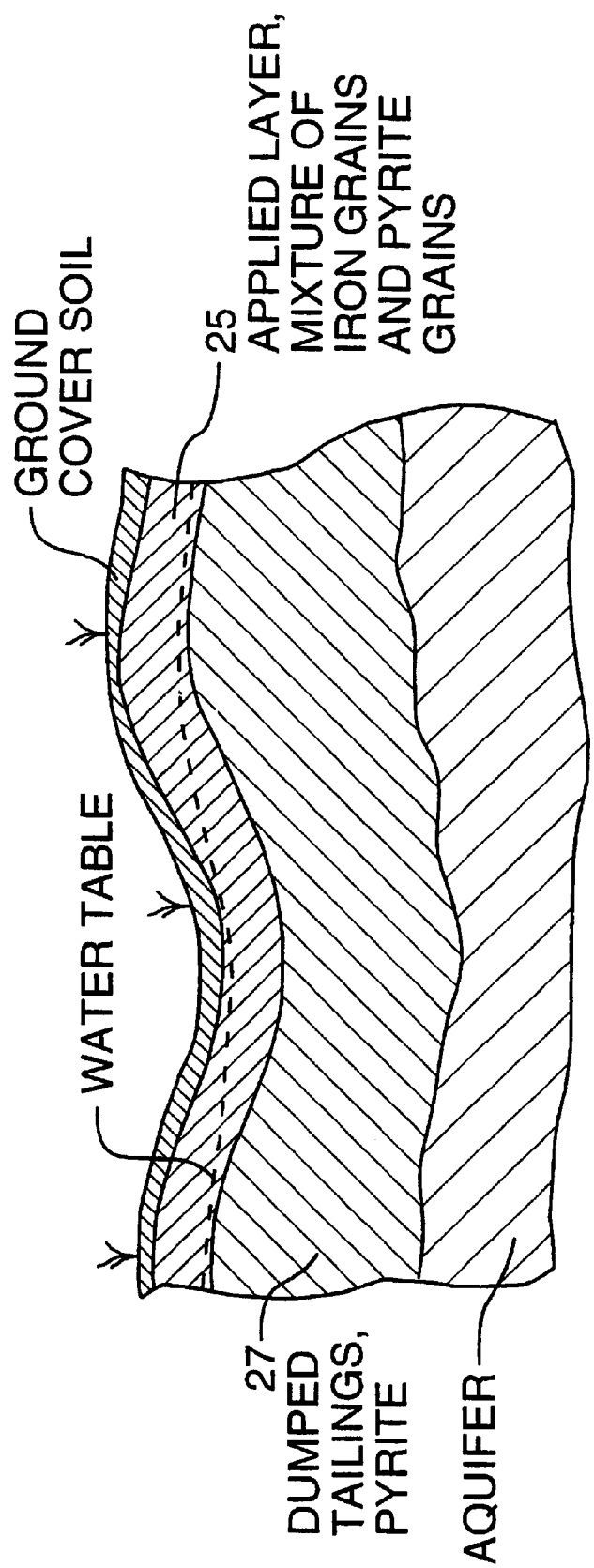
FIG. 3 is a cross-section of an installation of a mixture of many of the cells of FIG. 2.

In the present case, the lowering of the Eh voltage is achieved by galvanic action. FIG. 2 shows a grain A of pyrite, and a grain B of iron. As shown in FIG. 3, the grains A and B are components of a protective layer 25. The layer 25 overlies a body 27 of grains of pyrite. The grains A of pyrite in the protective layer 25 are derived from the body 27 of grains of pyrite. The grains B of iron are derived from an outside source of grains of iron, such as iron filings from industrial waste, etc. (Conveniently, the iron can be in the form of mild steel, or cast iron.)

The designer of the system is seeking to lower the Eh voltage of the solution. The progressive change of Eh and pH in an electrolytic solution of an iron-pyrite galvanic cell is indicated by the arrow 24 in FIG. 1. The arrow leads towards the predominance field of pyrite, the material which is cathode-protected by the cell, and in doing so, leads to a state of low Eh, and of negligible oxygen content. The arrow also leads to a higher pH, or lower acidity.

The grains A and B in FIG. 2 form a galvanic cell. The grain A of pyrite is the cathode and the grain B of iron is the anode. The point 29 of contact between the grains serves to conduct electrons between the anode and the cathode, and the surrounding water comprises the electrolyte of the cell. The volume 30 of water in the immediate vicinity of the electrodes is the volume that actually functions as electrolyte, and participates in the electrolytic reactions. In a typical case, the water within about 2 or 3 mm of a contact point can be expected to function as electrolyte. Beyond that, the electrolytic influence is negligible. Therefore, for effective treatment, the points of contact 29 between the pyrite grains and the iron grains should be no more than about 5 mm apart.

The grain size that will give the best results should be selected on the basis of providing contact points every 5 mm, assuming the grains have been thoroughly mixed. If the grains of pyrite are about the same size as the grains of iron, and if both are smaller than about 5 mm, there will be no difficulty in ensuring the desired pitch of contact points (provided the mixing is done in a thorough manner, so that the contact points are spaced evenly, on a statistically-random average basis). If the grains are small, the contact-point pitch spacing can be maintained even if grains of other material, e-g sand, are present in the mixture.

However, if the grains are large, some care is required to achieve the desired contact-point pitch spacing. In a case where the sulphide has not been processed (i.e crushed), but is simply present in the overburden that has been removed to uncover an ore, the grains of pyrite might be the size of large pebbles or rocks. In that case, the iron grains should still be less than 5 mm mesh size, in order to ensure a contact-point pitch spacing of 5 mm or less. Thus, each large rock of pyrite is surrounded by, and in contact with, perhaps dozens, or hundreds, of small grains of iron. In that case, if grains of sand or other inert material are also present, a considerable excess of iron grains might be required in order to meet the desired spacing.

An aim of the invention is to cathode-protect the grains of pyrite. If the grains of pyrite are large, cathode protection comes from ensuring that the pyrite grains (rocks) have many contact points with the (sacrificial) anode. A contact-point pitch spacing of 5 mm is suggested as being the limit of effectiveness of the electrolytic cathode-protection mechanism. The way to ensure many contact points, when the grains of pyrite are large, is to provide many grains of iron.

Often, however, the pyrite is crushed to a much finer grade than rock sized, although it is unusual for the pyrite in tailings dumps to have been crushed to less than about 1 mm mesh grain size. For pyrite grain sizes between 1 mm and 5 mm mesh, the iron grains preferably should be about the same size as the pyrite grains. Below about 1 mm grain size, the danger starts to arise that the pores in the permeable layer might become clogged and choked with dirt and precipitates.

On the other hand, sometimes the designer might wish to have the protective layer 25 become clogged and choked, if he can thereby ensure a watertight barrier to prevent water from infiltrating through the body of pyrite 27.

To prevent AMD from forming, the requirement is to prevent water containing oxygen from infiltrating the pyrite or other sulphide. Consider the case where a layer of grains of iron is provided, overlying the body of pyrite, and water passes first through the layer of grains of iron, and then enters the body of pyrite. In that case, at first, it would be expected that the iron extracts oxygen from the water, and forms iron hydroxide. Therefore, at first, the water reaching the pyrite has no oxygen, and AMD is avoided.

What also happens is that the grains of iron become coated with iron hydroxide. After a while, the coating extends over the whole grain. Now, there is no contact between the iron and the water, and so there is no more tendency for the water to draw the oxygen out of the water. So, if the protective layer were to comprise only grains of iron, once the grains of iron have been coated with a precipitated layer of iron hydroxide, the water now passes down between the grains, still with its oxygen content intact. When the still-oxygenated water enters the pyrite underneath, the AMD problem arises.

So in the case of a layer comprising only grains of iron, although such a layer might temporarily de-oxygenate the water, the effect would be short-lived. In fact, the iron grains in an iron-only layer will get coated with iron hydroxide whether there is pyrite underneath the iron or not. Sometimes, the coating of hydroxide might build up so much that the layer of the grains of iron becomes impermeable. So long as the layer remains watertight, and seals the pyrite underneath from infiltrating water, all is well; however, the layer might break as the ground settles, or is disturbed for some reason, and then still-oxygenated water could enter the pyrite. And the problem would simply get worse as the years went by. Therefore, it is recognised that a layer of only grains of iron, although seemingly able to de-oxygenate the water, can do so only temporarily and unreliably. Thus, the provision of a layer of only grains of one metal (iron, or other metal) is outside the invention. The invention requires the provision of the two materials A and B, which are separated in the electro-chemical series. Only then do the galvanic cells arise, whereby the pyrite becomes cathode-protected.

When the protective layer comprises grains of pyrite and grains of iron, mixed together, the galvanic action commences. Oxygenated water infiltrating the protective layer now has a quite-different effect. Now, the iron anode corrodes, and enters solution. The iron gets deposited on the cathode (i.e on the pyrite), either in the form of iron metal, or in many other forms, a common form of the deposition again being iron hydroxide. Therefore, now, when oxygenated water passes through the mixture of iron grains and pyrite grains, the iron dissolves and a coating of iron hydroxide forms on the pyrite grains (these grains being the cathodes). The water becomes de-oxygenated by the electrolytic action.

The problem of AMD arises when the body of sulphide becomes exposed to the atmosphere. AMD does not arise (and therefore no de-oxygenation is required) when the pyrite is submerged under deep water.

The system as described herein is applicable when the sulphide becomes exposed. The exposure, if it happens, is almost invariably only partial. That is to say, the pyrite is open to the atmosphere, but retains some moisture: also, sometimes the pyrite is saturated, and occasionally it dries out, more or less completely.

Pyrite under these conditions (which are the conditions commonly encountered in situations where treatment has become necessary) can be treated very effectively using the galvanic system as described herein. If the layer of the mixture of pyrite and iron grains should dry out, e.g in a drought, and the pyrite becomes exposed directly to the air, not much happens so long as conditions remain dry. But when it rains, it can take a considerable time for the layer to become submerged, during which time AMD would be produced if no precautions are taken. With the protective layer of the mixture, the galvanic action arises as soon as the grains become only slightly moist.

In the system as described herein, the galvanic protective action becomes stronger as the conditions that lead to AMD get worse. The system works by preventing AMD from arising, rather than by neutralising acidified water. Conventionally, the pyrite body has to be deep under water, in order for oxygenated water to be prevented from reaching the pyrite body. The galvanic reactions described herein arise if the pyrite body is not completely submerged, but is just moist. The action continues while there is moisture. If there were no moisture, the reaction would stop, but that is no detriment. Iron remains stable in the presence of sulphide, so long as there is no moisture. If moisture is present, the cathode-protection reaction commences.

The term cathode-protection refers to the creation by galvanic means of the stability conditions of, in this case, pyrite-in-water. By galvanic means is meant the transfer of electrons from the iron anode to the pyrite cathode. By stability conditions is meant the Eh-pH conditions at which $FeS_2$ is stable. The pyrite is stable in that it will not oxidise or reduce, will not dissolve, and will not create acidity. By cathode-protecting the pyrite, the pyrite cannot break down into solution and cause acidity.

It may be noted that the pyrite is used as one of the materials in the mixture, because it is there. Other sulphide minerals might be present, mixed in with the pyrite, or even in place of the pyrite. Iron is used because it is cheap and readily available.

Theoretically, the galvanic reaction can arise with many different combinations of materials. Cost-effectiveness is important, however, and it is recognised that, in a case where pyrite or other suitable sulphide is present, the savings arising from using the sulphide from the body of sulphide actually present at the site can be decisive.

Unlike the pyrite, which is already present at the site, the grains of iron have to be transported in. The engineer should order the grains of iron no larger than the grains of pyrite, or no larger than 5 mm mesh if that is smaller. It might be possible or advisable to crush the top layer of the pyrite to a smaller grain size, but generally processing of that kind is ruled out on cost grounds. It might also be desirable or possible to remove some of the inert bulk materials, such as sand, if present, from the pyrite, or at least from the top layer of the pyrite.

To make the mixture, at the site, the iron grains are applied on top of the pyrite that has become exposed, or is in danger of becoming exposed, and the grains of iron and the grains of pyrite in the top layer thereof, are thoroughly mixed in with each other.

As mentioned, the system as described herein can be used with a large variety of grain size in the pyrite. The system does not need finely-ground powder to make it work. Each contact point creates a certain area or region of cathode protection. The region or area of influence of the contact point has a certain dimension, depending on the parameters of the situation; once the pitch spacing of the contact points is small enough that the areas or regions of cathode influence overlap, no extra benefit in terms of the engineered reaction arises from engineering more contact points (e.g by going to smaller grains).

The system can be designed to clog up, if that is what the designer wants. A watertight layer of iron hydroxide/pyrite/iron is fine—if it can be engineered. If the layer ever cracks and breaks down, the galvanic protection system can be expected to start up again, and water coming through the break will pass through cathode-protected pyrite. So, when the protective layer comprises the mixture as described, a crack in the protective layer would be self sealing.

Generally, the designer will not introduce a filler, such as sand, into the mixture. If sand happens to be present in with the pyrite, it might be possible to remove some of the sand. The designer would rarely wish to add sand, as sand only serves to hold the pyrite and iron out of direct contact, but in a case where the pyrite is fine, and the added iron is also fine, adding sand might be done to maintain permeability.

Tailings might include pyrite in any concentration. Even a pyrite content as low as, say, five percent can lead to dangerous acidity. In that case, the designer might not wish to use the pyrite available at the site, but might prefer to import a more concentrated pyrite, for mixing with the iron grains for making the protective layer.

The aim is that the iron contact the pyrite every few millimetres. Under typically-encountered conditions, it is preferred that no point on the surface of the pyrite is more than about 3 mm from a contact point with a grain of iron. The engineer's task is to provide the grains sizes, volumetric ratios, degree of mixing, to achieve that. However, it is not too important if the 3 mm condition does not obtain all the way through the layer (as it likely will not in practice). So long as the water passing through is de-oxygenated, it does not matter if some of the grains of sulphide are over-exposed to the water. The sulphide remains stable so long as the water is de-oxygenated down to the Eh-pH conditions in which the sulphide is stable.

The expression grains or particles as used herein should be understood as being of broad scope. Thus, the grains of iron might be provided as pieces of wire, for example. Even if the wire is in long lengths, the wire can have a similar characteristic to a more evenly-dimensioned grain, in terms of the ratio of surface area to volume, and long lengths of wire are intended to be understood as grains. Even deliberately-constructed wire items, such as metallic mesh, chain link fencing, chicken wire, pieces of scrap iron, etc, are intended to be construed as grains of iron, in the context of the invention.

The protective layer can include more than two conductors (or semi-conductors). The de-oxygenation treatment as described herein works by establishing an ensemble of local, miniaturised, galvanic cells, each cell involving a wet contact between particles of different conductors or semi-conductors. A mixture of a large number of grains of the two conductors contains, when water is present, a large number of galvanic contacts, and will modify the Eh-pH characteristics of the water along paths similar to that indicated by the arrow in FIG. 1. The water moves in Eh-pH space towards the predominance field of the cathode-protected pyrite, and becomes de-oxygenated.

Experiments have shown that a mixture of iron filings and small particles of pyrite can drive the Eh voltage of the water down as low as −400 milli-volts, which is a highly reduced redox state. In a practical case, the extent of the de-oxygenation depends on what materials A and B are used, the relative proportions of the materials, the relative grain sizes, the depth or thickness of the layer, the permeability of the layer, the rate of flow-through of water, etc. The designer can vary these parameters, to produce water with a specific level or range of de-oxygenation, suitable for a particular applications.

As the iron or other anodic material is consumed, ionic iron enters solution, leading to the precipitation of Fe(OH)3, ferric hydroxide, or ferrihydrite. Other species are possible, depending on concentrations, presence of other elements, metals, etc. In fact, it might be possible to recover such other metals. If the water, or the protective layer, contains metals such as copper, manganese, zinc, the metals can be removed by such processes as adsorption onto the ferric hydroxide, precipitation as their own hydroxy compounds as pH increases, and electro-plating onto the cathodic grains.

Figure 4:
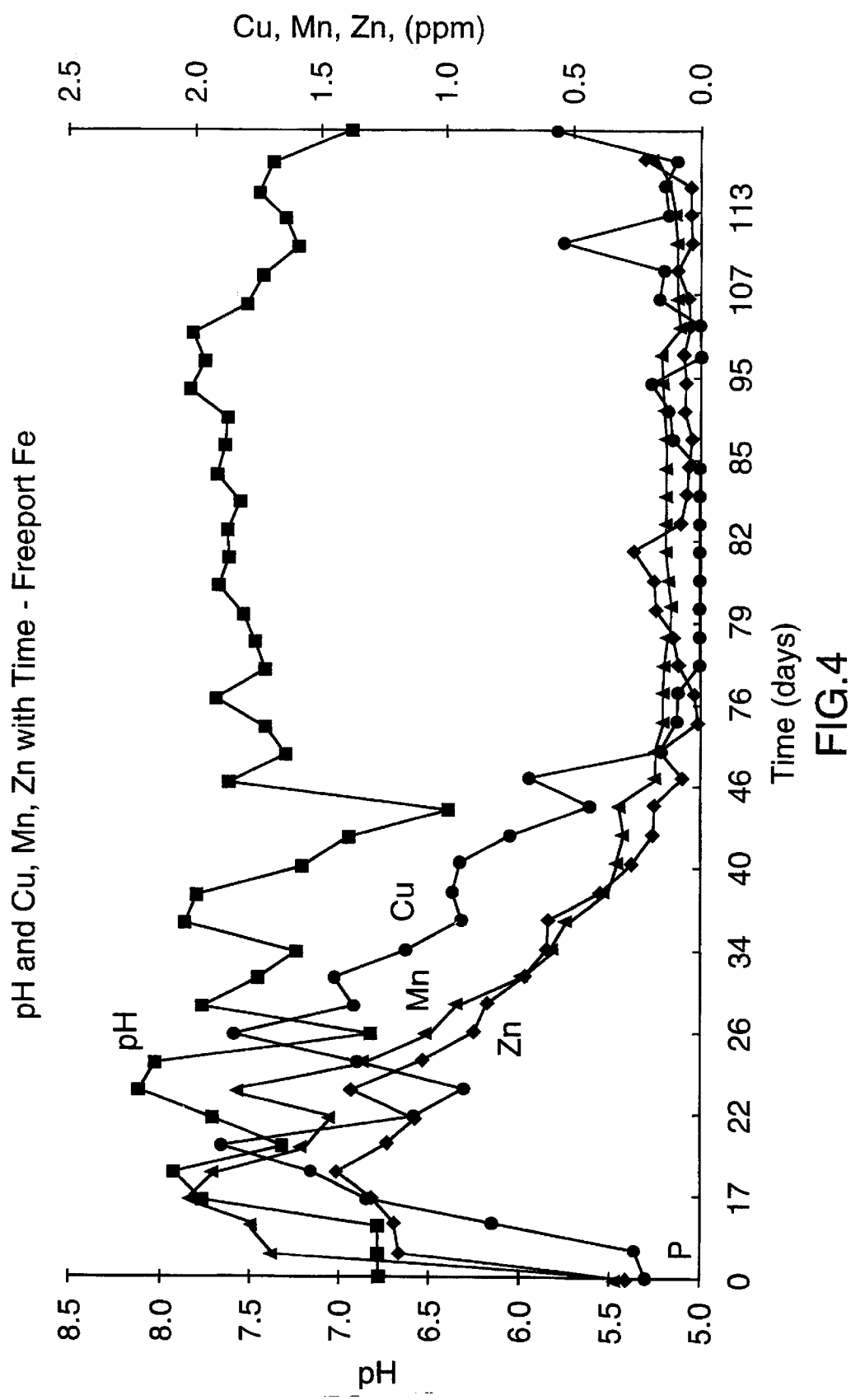
FIG. 4 is a graph of the results of an experiment, in which dissolved metals were extracted from water.

FIG. 4 shows the result of a test in which those metals were recovered, the water contaminated by the metals being thereby cleaned.

As shown in FIG. 3, the protective layer comprising the mixture of iron grains and pyrite grains is applied over the body of pyrite. Water passing through the protective layer is de-oxygenated, and upon reaching the pyrite body is unable to participate in those chemical reactions requiring oxygen.

Besides pyrite, the substratum underneath the protective layer might contain other materials capable of oxidising to release toxic substances into the groundwater. It can be expected that such reactions will also be alleviated by the galvanic, cathode-protection system as described herein.

The protective layer has been shown as having been applied above the body of pyrite or other sulphide. However, the layer can be inserted vertically, or at an angle, as appropriate to the path of water entering and leaving the sulphide.

The protective material mixture can be enclosed in a mesh container, such as a gabion. The gabion provides physical support for the grains making up the mixture (the grain size being larger than the aperture size of the mesh). The gabions can be stacked to intercept the water in a watercourse, for example, or can be laid upon sloping ground, where a loose layer of the mixture of grains might be in danger of erosion. Insofar as the wire of the gabion is steel, the wire serves as grains of iron.

What is claimed is:

1. Procedure for protecting water from acidity caused by passing relatively oxygenated water through a body of a sulphide mineral, wherein the procedure includes the steps of:

providing a permeable layer of a protective material;

providing the layer in such a manner and position relative to the body of sulphide mineral that the layer intercepts the water prior to the water entering the body;

wherein the protective material comprises grains of material A and grains of material B;

wherein material A comprises a sulphide mineral;

wherein material B comprises a material that is more electro-positive than the sulphide mineral;

wherein the materials A and B are electrically-conductive; thoroughly mixing the grains of materials A and B, whereby, on a random average basis, the grains of material A are in intimate touching contact with the grains of material B;

passing the water into the layer, and maintaining electrolytic continuity in the layer, whereby the grains of materials A and B, where they touch, form galvanic cells, material A being the cathode thereof and material B being the anode.

2. Procedure of claim 1, wherein the protective layer is thick or deep enough that water emerging from the layer has had a sufficient residence time therein that the water has been at least partially de-oxygenated by its passage through the layer.

3. Procedure of claim 1, wherein the protective layer is thick or deep enough that water emerging from the protective layer and entering the sulphide mineral has had a sufficient residence time therein that the water has been so de-oxygenated by its passage through the protective layer that its Eh voltage is less than about −100 millivolts.

4. Procedure of claim 1, including the step of providing the grains of the material A as grains of the sulphide mineral from the body thereof.

5. Procedure of claim 4, wherein the body of sulphide lies on the ground at a site, and the procedure includes the steps of:

providing a quantity of grains of the material B, and transporting same to the site;

and forming the protective layer by mechanically mixing the grains of material B into an upper layer of the sulphide mineral in the body thereof at the site.

6. Procedure of claim 1, wherein the grains of the electro-positive material B are no larger, on a random average basis, than the grains of the sulphide material A.

7. Procedure of claim 6, wherein the grains of the electro-positive material B are no larger, on a random average basis, than about 5 mm mesh size.

8. Procedure of claim 1, including the step of providing the material B, as to the number and size of the grains thereof, in relation to the number and size of the grains of material A, such that, on a random average basis, points on the surfaces of the grains of material A are no more than about 3 mm from a contact point with material B.

9. Procedure of claim 1, wherein, as to the presence of materials other than material A and material B in the protective layer, the procedure includes the step of limiting the content of such other materials in the layer to the extent that, on a random average basis, all points on the surface of the grains of material A are no more than about 3 mm from one of the contact points with material B.

10. Procedure of claim 1, wherein the body of sulphide mineral is so disposed in the ground that oxygenated water approaches the body at a velocity having a horizontal component, and the procedure includes the step of excavating a receptacle in the ground in the path of the water, and inserting the mixture in the said receptacle.

11. Procedure of claim 1, including the step of recovering from the mixture an economically-valuable metal that has been precipitated in the mixture.

12. Procedure of claim 1, including the step of leaving the mixture in place long enough that precipitations in the mixture render the protective layer impermeable.

13. Procedure of claim 1, including the step of providing the mixture in gabions.

14. Procedure of claim 1, wherein the material A is pyrite and the material B is iron.

15. Procedure for de-oxygenating water, wherein the procedure includes the steps of:

provided a quantity of grains of a material A, and a quantity of grains of a material B;

wherein material A comprises a sulphide mineral;

wherein material B comprises a material that is more electro-positive than the sulphide mineral;

wherein the materials A and B are electrically-conductive;

making a mixture of the materials A and B by thoroughly mixing the grains of materials A and B, whereby, on a random average basis, the grains of material A are in intimate touching contact with the grains of material B;

forming the mixture into a permeable layer, and passing the water into and through the permeable layer;

maintaining electrolytic continuity in the mixture in the layer, whereby the grains of materials A and B, where they touch, form galvanic cells, material A being the cathode thereof and material B being the anode;

wherein the layer is thick or deep enough that water emerging from the layer has had a sufficient residence time therein that the water has been at least partially de-oxygenated by its passage through the layer.

16. Procedure of claim 15 wherein the procedure includes the step of providing the mixture in a container, with an entry port and an exit port for conveying water therethrough.

* * * * *